US012680525B1

(12) United States Patent
Zhang et al.

(10) Patent No.: US 12,680,525 B1
(45) Date of Patent: Jul. 14, 2026

(54) TURBINE HYDROELECTRIC POWER GENERATION DEVICE, AND POWER GENERATION METHOD BASED ON PRESSURIZED WATER INLET PIPELINES

(71) Applicants: SHIJIAZHUANG TIEDAO UNIVERSITY, Shijiazhuang City (CN); HEBEI WATER CONSERVANCY ENGR BUREAU GROUP LIMITED, Shijiazhuang City (CN); SHIJIAZHUANG HUFU ENGINEERING CO., LTD., Shijiazhuang City (CN)

(72) Inventors: Liting Zhang, Shijiazhuang City (CN); Hongqiang Ding, Shijiazhuang City (CN); Bin Liu, Shijiazhuang City (CN); Huiqing Wang, Shijiazhuang City (CN); Xiang Gao, Shijiazhuang City (CN); Jiangbo Liu, Shijiazhuang City (CN); Bo Zhang, Shijiazhuang City (CN); Zhiwei Cui, Shijiazhuang City (CN); Xinwei Zhang, Shijiazhuang City (CN); Shaoxiong Zhang, Shijiazhuang City (CN); Haiqiang Zhang, Shijiazhuang City (CN); Shichao Zheng, Shijiazhuang City (CN); Yan Liu, Shijiazhuang City (CN); Jianhui Liu, Shijiazhuang City (CN); Wenjun Ma, Shijiazhuang City (CN); Yang Ma, Shijiazhuang City (CN); Shengqi Mei, Shijiazhuang City (CN)

(73) Assignees: SHIJIAZHUANG TIEDAO UNIVERSITY, Shijiazhuang City (CN); HEBEI WATER CONSERVANCY ENGR BUREAU GROUP LIMITED, Shijiazhuang City (CN); SHIJIAZHUANG HUFU ENGINEERING CO., LTD, Shijiazhuang City (CN)

( * ) Notice: Subject to any disclaimer, the term of this patent is extended or adjusted under 35 U.S.C. 154(b) by 0 days.

(21) Appl. No.: 19/429,321

(22) Filed: Dec. 22, 2025

(30) Foreign Application Priority Data

Apr. 1, 2025 (CN) ......................... 202510400934.2

(51) Int. Cl.
*F03B 13/00* (2006.01)

(52) U.S. Cl.
CPC ........ *F03B 13/00* (2013.01); *F05B 2220/706* (2013.01)

(58) Field of Classification Search
CPC ........................... F03B 13/00; F05B 2220/706
See application file for complete search history.

(56) References Cited

U.S. PATENT DOCUMENTS 7,222,487 B1 * 5/2007 Hinkley .................... F03G 7/10 290/43
10,683,839 B2 * 6/2020 Maynard .................. F03D 9/11
2014/0250879 A1 * 9/2014 Moncada .............. F03B 17/005 60/495

* cited by examiner

*Primary Examiner* — Julio C. Gonzalez
(74) *Attorney, Agent, or Firm* — Maschoff Brennan

(57) ABSTRACT

According to a turbine hydroelectric power generation device and a power generation method based on pressurized water inlet pipelines, after water flows are input into liquid inlet flow channels and guided by guide vanes, by arranging the liquid inlet flow channels that are the vortex-shaped spiral flow channels, it can be ensured that the water flows are evenly diverted by the guide vanes and thus are output to a driving rotor at the same flow velocity to impact and drive the driving rotor to rotate. The driving rotor can drive, during rotation, a power generation rotor to rotate inside a (Continued)

magnetic power generation mechanism to generate electricity, and the input water flows are finally collected by a bottom liquid discharge mechanism and then separated into multiple water flows to be output respectively.

18 Claims, 12 Drawing Sheets

TURBINE HYDROELECTRIC POWER GENERATION DEVICE, AND POWER GENERATION METHOD BASED ON PRESSURIZED WATER INLET PIPELINES

CROSS-REFERENCE TO RELATED APPLICATION

This patent application claims the benefit and priority of Chinese Patent Application No. 202510400934.2 filed with the China National Intellectual Property Administration on Apr. 1, 2025, the disclosure of which is incorporated by reference herein in its entirety as part of the present application.

TECHNICAL FIELD

The present disclosure relates to the technical field of hydroelectric power generation devices, and in particular to a turbine hydroelectric power generation device, and a power generation method based on pressurized water inlet pipelines.

BACKGROUND

The water energy utilized for hydroelectric power generation mainly comes from the potential energy of a water body; in order to convert water energy into electrical energy, it is required to construct different types of hydropower plants. The basic principle of hydroelectric power generation is to generate electricity by utilizing a water height difference in cooperation with a water turbine generator, that is, obtain electricity by converting the potential energy of water into the mechanical energy of a water turbine and then using the mechanical energy to propel a generator. At present, due to the main canal in the middle line of the south-to-north water transfer project runs through the North China Plain, a provincial water supply network is constructed by using the water source quota for the North China region in the south-to-north water transfer project. This is a significant advantageous measure for the implementation of the groundwater withdrawal reduction in North China and bringing convenience to the life and production water supply in the vast rural areas of North China.

In the project of using river water as a domestic water source river downstream of the south-to-north water transfer project, with regard to water plants, supporting main canals (such as Baocang main canal, Xingqing main canal and Langzhuo main canal), special line pipe networks (special line pipe networks supporting for mainly water users, such as special line pipe networks supporting for Shahe power plant and Dingzhou Development Zone) and other supporting water networks, part of water still have the loss of water potential on the premise of ensuring the supply of daily water pressure; in order to use the potential energy of this part of water, pressurized water inlet pipelines at the tail part of the south-to-north water transfer project are provided with small power generation devices to make full use of the remaining water energy and convert the remaining water energy into electrical energy.

Since most of conventional small power generation devices have been arranged at the branch pipes of the pressurized water inlet pipelines, and in the water plants at the tail part of the south-to-north water transfer project, due to the presence of a large number of dense pressurized water inlet pipelines, when a large number of small power generation devices are insufficient in water pressure, it is difficult to use the water pressure, which is prone to causing the power generation devices to be idle for a long time and leading to unstable generated power and unstable time of power generation, and is also prone to impacting power grids.

SUMMARY

In view of the shortcomings of the conventional art, the present disclosure provides a turbine hydroelectric power generation device, and a power generation method based on pressurized water inlet pipelines.

In order to solve the above technical problems, the present disclosure provides the following technical solutions.

A turbine hydroelectric power generation device includes a top liquid inlet mechanism, a middle fixing shell and a bottom liquid discharge mechanism, where a driving rotor is rotatably arranged inside the middle fixing shell, and the top liquid inlet mechanism is arranged on an outer side of a top end of the middle fixing shell; a magnetic power generation mechanism is arranged above the middle fixing shell, a power generation rotor is rotatably arranged inside the magnetic power generation mechanism, and the driving rotor and the power generation rotor are coaxially secured; the top liquid inlet mechanism includes multiple liquid inlet flow channels, the multiple liquid inlet flow channels are all arranged around an outer side of the middle fixing shell, the multiple liquid inlet flow channels are all vortex-shaped spiral flow channels, and a cross section of each of the multiple liquid inlet flow channels gradually decreases from a head end to a tail end; a side of each of the multiple liquid inlet flow channels adjacent to the driving rotor is provided with multiple guide vanes, and after a water flow input from the head end of each of the multiple liquid inlet flow channels is guided by the multiple guide vanes, the water flow is output to the driving rotor at a same flow velocity and impacts and drives the driving rotor to rotate; the driving rotor is capable of driving, during rotation, the power generation rotor to rotate inside the magnetic power generation mechanism to generate electricity.

In some embodiments, the top liquid inlet mechanism further includes a flow distributor, the flow distributor is capable of communicating with liquid inlet branch pipes, and liquid input into the liquid inlet branch pipes is capable of entering an interior of the flow distributor; the bottom liquid discharge mechanism includes an integral liquid discharge mechanism and a shunting liquid discharge mechanism, and the liquid output from the integral liquid discharge mechanism can be dispensed by the shunting liquid discharge mechanism to be output to multiple liquid discharge branch pipes; each of the liquid inlet branch pipes corresponds to one of the multiple liquid discharge branch pipes, and each of the liquid inlet branch pipes and a corresponding one of the multiple liquid discharge branch pipes communicate with a main pipeline.

In some embodiments, the flow distributor includes a liquid collecting tank and a liquid dispenser, the liquid inlet branch pipes communicate with the liquid collecting tank, the liquid is capable of being input into the liquid collecting tank from the liquid inlet branch pipes, and the flow distributor is capable of outputting the liquid inside the liquid collecting tank to the multiple liquid inlet flow channels at a same flow velocity, a same flow rate and a same output height; total lengths of the multiple liquid inlet flow channels are same, and a height difference between the head end and the tail end of each of the multiple liquid inlet flow channels is also equal.

In some embodiments, the multiple liquid inlet flow channels have a vortex centerline, and included angles between the multiple guide vanes and the vortex centerline are same; deflection rods are arranged at ends of the multiple guide vanes, the deflection rods penetrate through the multiple liquid inlet flow channels, and drive gears are arranged at ends of the deflection rods outside the multiple liquid inlet flow channels; a synchronous adjustment ring gear is arranged on an outer side of a circumference defined by the drive gears, the synchronous adjustment ring gear simultaneously meshes with the drive gears, and the included angles between the multiple guide vanes and the vortex centerline are capable of being adjusted synchronously by driving the synchronous adjustment ring gear to rotate.

In some embodiments, the driving rotor includes a rotor housing and multiple rotor blades, each of the multiple guide vanes corresponds to one of the multiple rotor blades, connecting rotary disks are arranged at ends of the multiple rotor blades adjacent to the rotor housing, and the connecting rotary disks are embedded on a surface of the rotor housing; included angles between the multiple rotor blades and a vertical plane are same, the connecting rotary disks are rotatably connected to the rotor housing, and sealing is kept between the connecting rotary disks and the rotor housing during rotation of the connecting rotary disks.

In some embodiments, rotary connection rods are rotatably arranged on sides of the connecting rotary disks inside the rotor housing, the rotary connection rods are rotatably connected to lifting drive disks by means of lifting connection rods, and vertical ascending and descending of the lifting drive disks is controlled by means of drive cylinders; during the vertical ascending and descending of the lifting drive disks, the connecting rotary disks rotate synchronously to adjust the included angles between the rotor blades and the vertical plane.

In some embodiments, a cooperating adjustment mechanism is arranged on an inner side of the circumference defined by the drive gears, and the cooperating adjustment mechanism includes a cooperating drive ring gear, rotary enlargement gears and rotary drive racks; an outer side of the cooperating drive ring gear meshes simultaneously with the drive gears, a top end of the cooperating drive ring gear meshes with the rotary enlargement gears, the rotary enlargement gears are coaxially fixed with driven gears, and the rotary drive racks mesh with the driven gears; reset springs are arranged at bottom ends of the rotary drive racks, a cooperating drive plate is further arranged outside movable ends of the drive cylinders, and a cooperating press plate is connected to a bottom end of the cooperating drive plate through cooperating cylinders.

In some embodiments, when the included angles between the multiple guide vanes and the vortex centerline as well as the included angles between the multiple rotor blades and the vertical plane are cooperatively controlled, the cooperating press plate is brought into abut against top ends of the rotary drive racks through an extension of the cooperating cylinders, and under driving of the drive cylinders, the included angles between the multiple guide vanes and the vortex centerline are adjusted in synchronism with the included angles between the multiple rotor blades and the vertical plane; when the included angles between the multiple guide vanes and the vortex centerline as well as the included angles between the multiple rotor blades and the vertical plane are respectively controlled, the cooperating cylinders retract, and the cooperating press plate is kept disengaged from the rotary drive racks as the drive cylinders drive the cooperating press plate to move; the included angles between the multiple rotor blades and the vertical plane are synchronously adjustable by means of the driving of the drive cylinders, and the included angles between the multiple guide vanes and the vortex centerline are synchronously adjustable by means of driving of the synchronous adjustment ring gear.

In some embodiments, the integral liquid discharge mechanism is arranged at a bottom end of the driving rotor, and an inner diameter of the integral liquid discharge mechanism gradually increases and then gradually decreases from top to bottom; the power generation rotor is rotatable along with the rotation of the driving rotor, and magnetic induction lines inside the magnetic power generation mechanism are cut to generate electricity during rotation of the power generation rotor.

A power generation method based on pressurized water inlet pipelines, which uses the turbine hydroelectric power generation device described above, includes the following steps:

- introducing liquid inlet branch pipes and multiple liquid discharge branch pipes from the pressurized water inlet pipelines, and arranging control valves on the pressurized water inlet pipelines, the liquid inlet branch pipes and the multiple liquid discharge branch pipes;
- communicating the liquid inlet branch pipes with the multiple liquid inlet flow channels, respectively, and communicating the multiple liquid discharge branch pipes with the bottom liquid discharge mechanism;
- closing the control valves of the pressurized water inlet pipelines, and opening the control valves of the liquid inlet branch pipes and the control valves of the multiple liquid discharge branch pipes;
- outputting water flows through the pressurized water inlet pipelines from the liquid inlet branch pipes to the multiple liquid inlet flow channels, respectively, after guiding the water flows by the multiple guide vanes, outputting the water flows to the driving rotor at the same flow velocity to impact and drive the driving rotor to rotate, and then inputting, through the bottom liquid discharge mechanism, the water flows into the pressurized water inlet pipelines from the multiple liquid discharge branch pipes, respectively;
- driving, during the rotation of the driving rotor, the power generation rotor to rotate inside the magnetic power generation mechanism to generate electricity.

Compared with the conventional art, the present disclosure provides a turbine hydroelectric power generation device, and a power generation method based on pressurized water inlet pipelines, which have the following beneficial effects.

1. According to the turbine hydroelectric power generation device, after the water flows are input into the liquid inlet flow channels and guided by the guide vanes, by arranging the liquid inlet flow channels that are the vortex-shaped spiral flow channels, it can be ensured that the water flows are evenly diverted by means of the guide of the guide vanes and thus are output to the driving rotor at the same flow velocity to impact and drive the driving rotor to rotate. The driving rotor can then drive, during rotation, the power generation rotor to rotate inside the magnetic power generation mechanism to generate electricity, and the input water flows are finally collected by the bottom liquid discharge mechanism and then separated into multiple water flows to be output respectively. Accordingly, the energy of the water flows input from the liquid inlet flow channels can be stably utilized, the stability of the rotational speed of the driving rotor can be ensured by means of the guide of the guide vanes and uniform diversion of the vortex-shaped spiral flow channels, the power stability of power generation by means of the rotation of the power generation rotor inside the magnetic power generation mechanism can thus be ensured, so that a power generation effect can be ensured while the fluctuation of power generation is avoided from affecting the stability of a power grid.

2. According to the turbine hydroelectric power generation device, the water flows input into input pipelines first is first collected by the liquid collecting tank, the liquid inside the liquid collecting tank is output to the liquid inlet flow channels at the same flow velocity, the same flow rate and the same output height under the action of the distributor. The stability of the water flows respectively output from the liquid inlet flow channels can be ensured by controlling the distributor when the water flow rates of the input pipeline are unstable. Due to the fact that the liquid inlet flow channels have the equal total lengths and the equal height differences, the stability of the rotational speed of the driving rotor can be ensured by means of the guide of the guide vanes and the uniform diversion of the vortex-shaped spiral flow channels; the instability of the water flow rate due to the fluctuation in downstream water consumption can be effectively avoided from impacting the stability of power generation. The liquid output from the integral liquid discharge mechanism can also be output to the multiple liquid discharge branch pipes by means of the dispensing of the shunting liquid discharge mechanism, the uniformity of the water flows output from the liquid discharge branch pipes is ensured, the effective supply of the downstream water flows is thus ensured. Therefore, while ensuring downstream water supply, the stability of power generation is ensured.

3. According to the turbine hydroelectric power generation device, the cooperating press plate is brought into abut against the top ends of the rotary drive racks due to the extension of the cooperating cylinders, and under the driving of the drive cylinders, the included angles between the guide vanes and the vortex centerline are adjusted in synchronism with the included angles between the rotor blades and the vertical plane. By means of retraction of the cooperating cylinders, the cooperating press plate is kept disengaged from the rotary drive racks as the drive cylinders drive the cooperating press plate to move, the included angles between the rotor blades and the vertical plane can be synchronously adjusted by means of the driving of the drive cylinders, and the included angles between the guide vanes and the vortex centerline can be synchronously adjusted by means of the driving of the synchronous adjustment ring gear. Accordingly, by means of the above cooperative control and the respective control, the included angles between the guide vanes and the vortex centerline can be dynamically adjusted synchronously according to an actual water flow rate, the mutual matching of the water flow rate and the generated power can thus be effectively ensured, and the effect of power generation can be improved.

4. According to the power generation method based on the pressurized water inlet pipelines, by introducing the liquid inlet branch pipes and the liquid discharge branch pipes from the pressurized water inlet pipelines, it is ensured that on the premise of ensuring the safe water supply of a water plant, the water inflow of the water plant is implemented through bypass pipelines during normal operation of the device, and in case of the maintenance or malfunction of the device, the water inflow is implemented by switching the bypass pipelines to the original pressurized water inlet pipelines, ensuring the stability of water supply of the water plant. By arranging the multiple liquid inlet flow channels 11, the converged water flows from the multiple pressurized water inlet pipelines are fully used, the number of the power generation devices coming into service is decreased while increasing the quantity of water inflow and ensuring generated power, and the costs for utilizing the remaining water energy are saved.

In the figures: 1 top liquid inlet mechanism; 11 liquid inlet flow channel; 111 guide vane; 112 deflection rod; 113 drive gear; 12 synchronous adjustment ring gear; 2 middle fixing shell; 3 bottom liquid discharge mechanism; 31 integral liquid discharge mechanism; 32 shunting liquid discharge mechanism; 4 driving rotor; 41 rotor housing; 42 rotor blade; 43 connecting rotary disk; 44 rotary connection rod; 45 lifting connection rod; 46 lifting drive disk; 47 driving cylinder; 48 cooperating drive plate; 481 cooperating cylinder; 482 cooperating press plate; 5 magnetic power generation mechanism; 6 power generation rotor; 7 cooperating adjustment mechanism; 71 cooperating drive ring gear; 72 rotary enlargement gear; 73 rotary drive rack; 74 driven gear; 75 reset spring; 8 flow distributor; 81 liquid collecting tank; 82 liquid dispenser; 9 main pipeline; 91 liquid inlet branch pipe; 92 liquid discharge branch pipe; 93 pressurized water inlet pipeline; 94 control valve; 10 vortex centerline.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the embodiments described are merely some rather than all of the embodiments of the present disclosure. On the basis of the embodiments in the present disclosure, all other embodiments obtained by those of ordinary skill in the art without involving creative effort belong to the scope of protection of the present disclosure.

As described in the background, there are shortcomings in the conventional art. In order to solve the above technical problems, the present disclosure provides a turbine hydroelectric power generation device and a power generation method based on pressurized water inlet pipelines.

Embodiment 1

Figure 1:
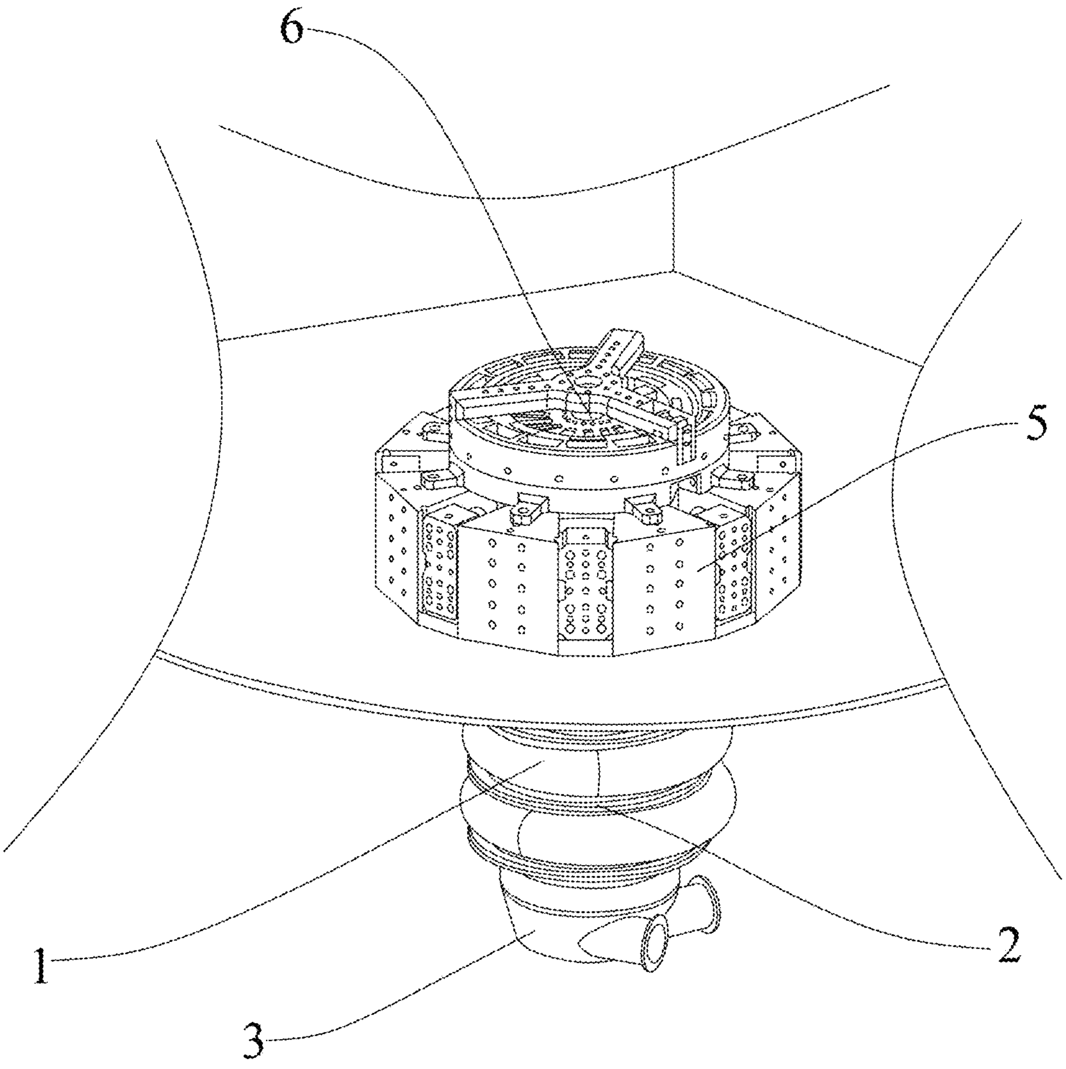
FIG. 1 is a schematic diagram of a turbine hydroelectric power generation device mounted in a plant according to an embodiment of the present disclosure.
Figure 2:
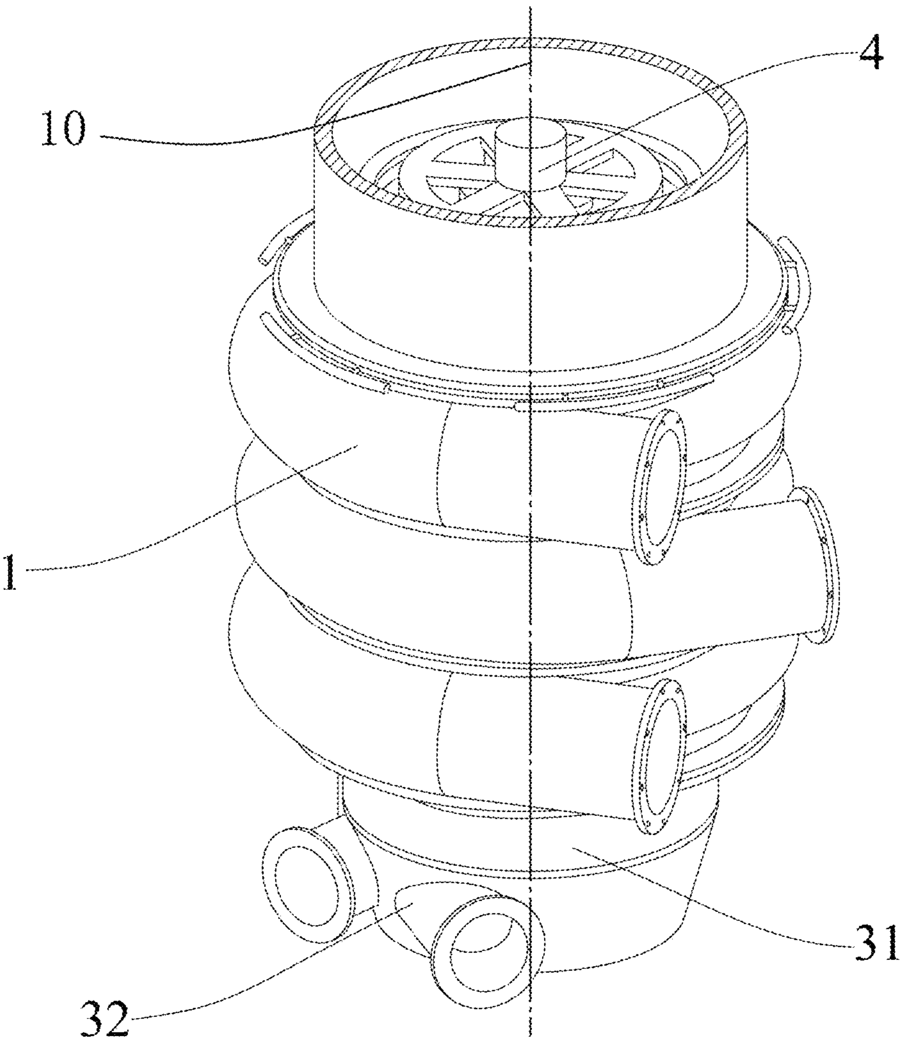
FIG. 2 is a perspective schematic structural diagram of a top liquid inlet mechanism and a bottom liquid discharge mechanism of the turbine hydroelectric power generation device according to an embodiment of the present disclosure.
Figure 3:
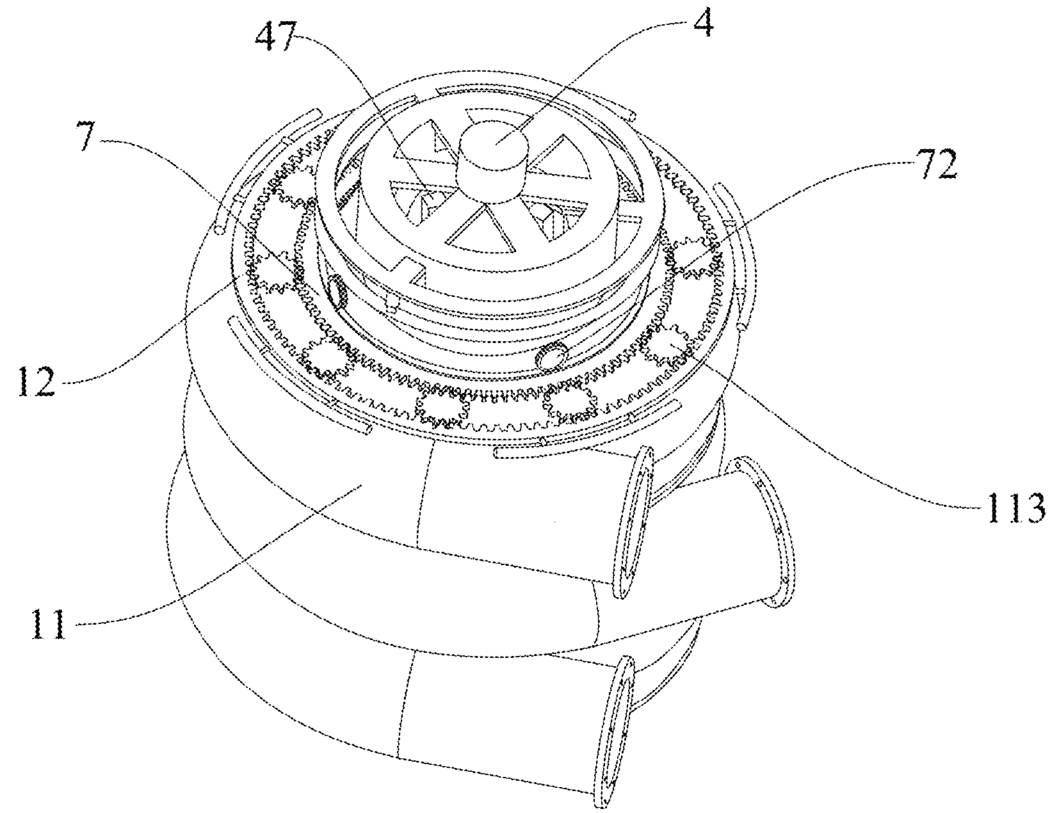
FIG. 3 is a perspective schematic structural diagram of the top liquid inlet mechanism, a driving rotor and a cooperating adjustment mechanism of the turbine hydroelectric power generation device according to an embodiment of the present disclosure.
Figure 4:
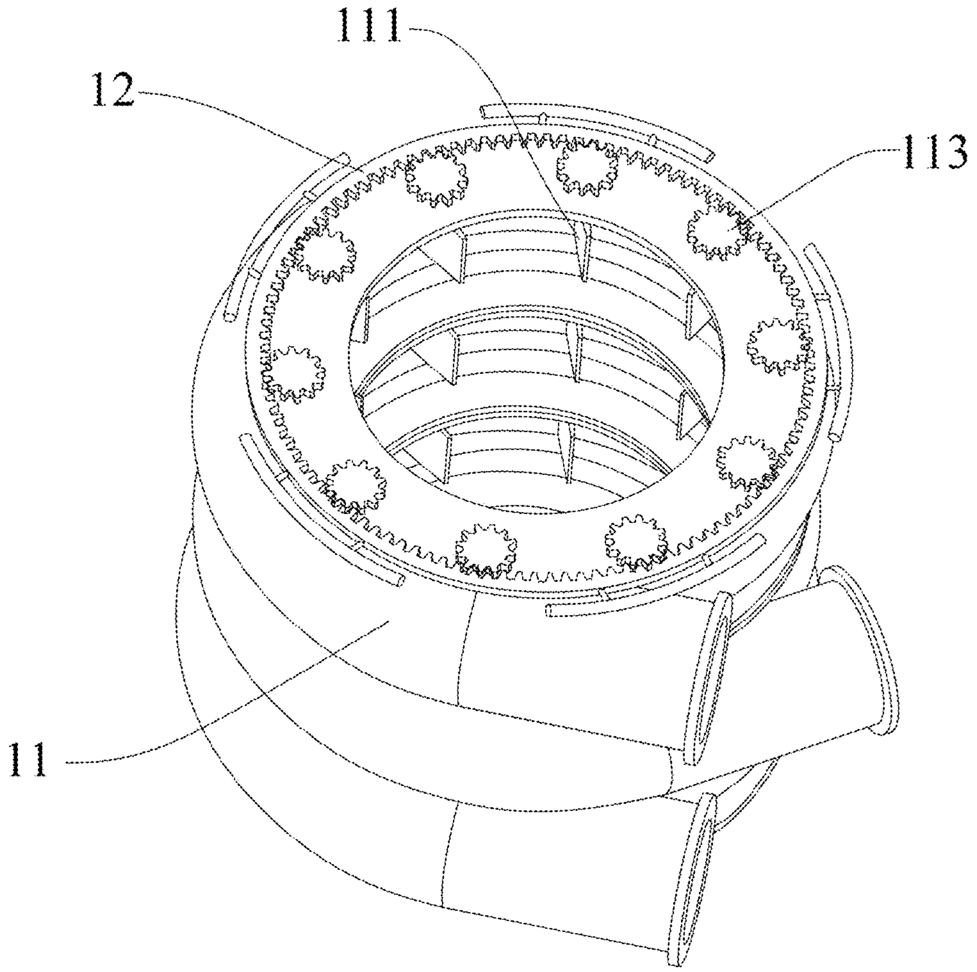
FIG. 4 is a perspective schematic structural diagram of the top liquid inlet mechanism of the turbine hydroelectric power generation device according to an embodiment of the present disclosure.
Figure 5:
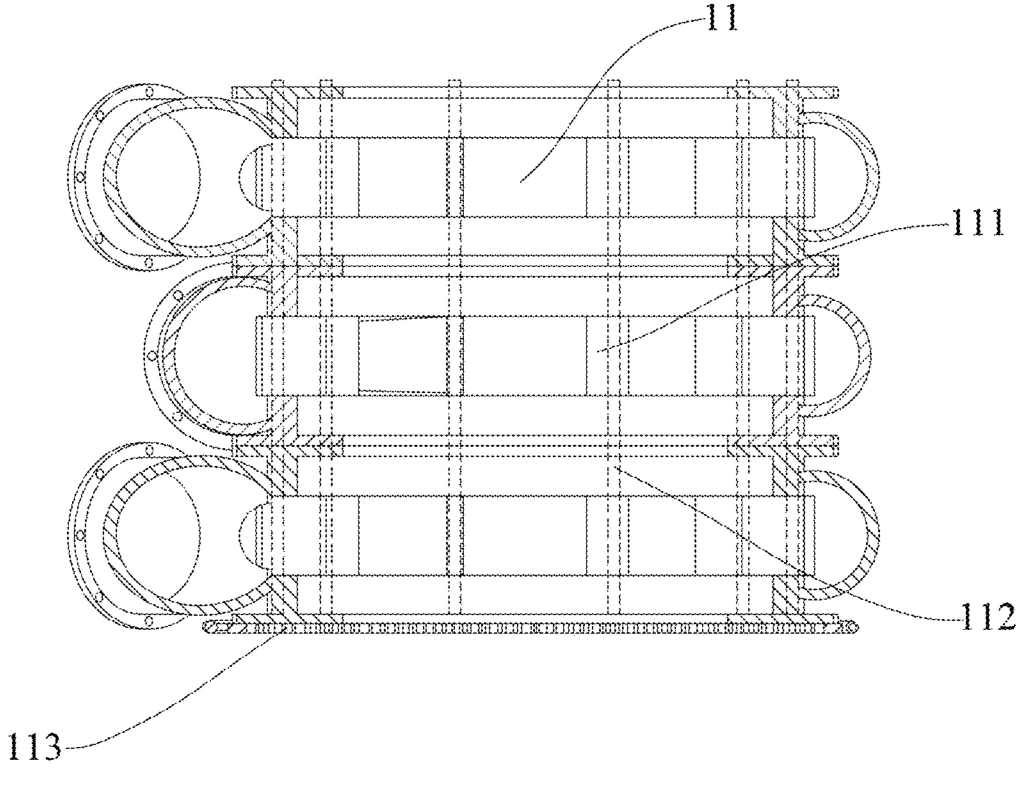
FIG. 5 is a schematic sectional view of the top liquid inlet mechanism of the turbine hydroelectric power generation device according to an embodiment of the present disclosure.
Figure 6:
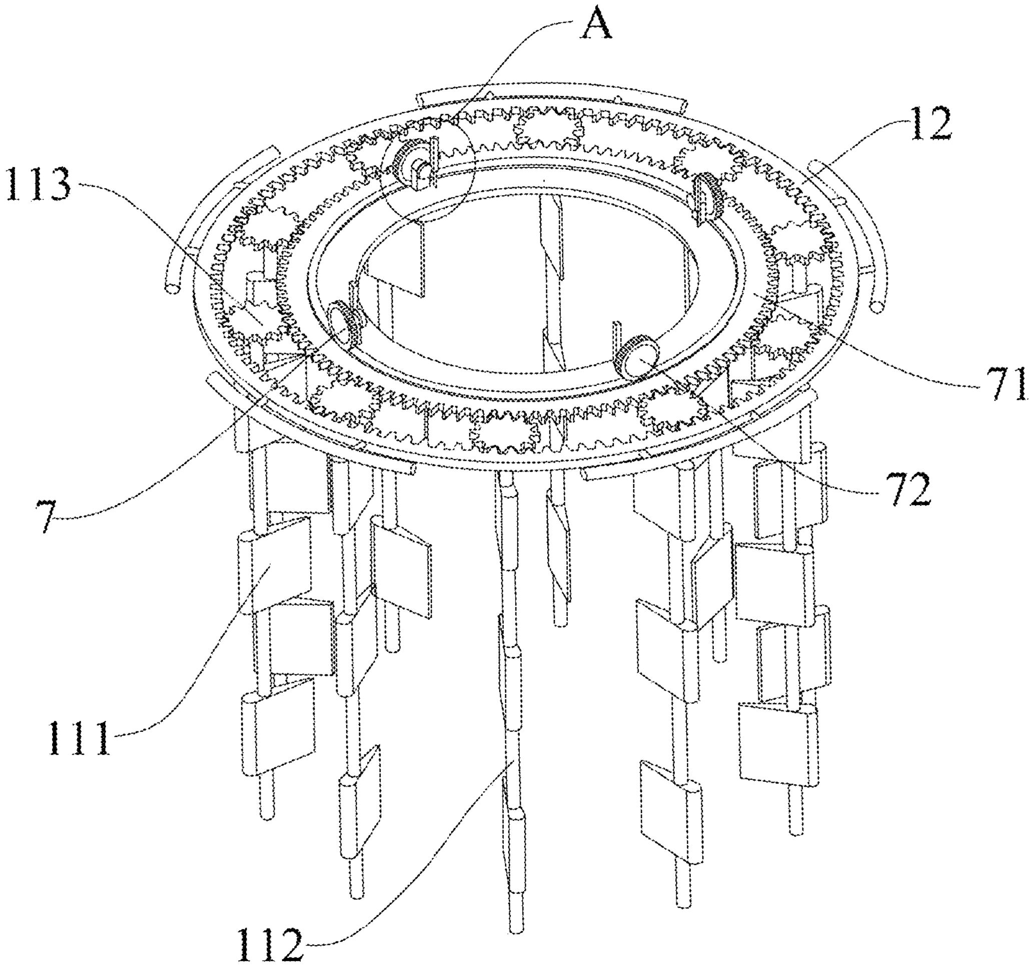
FIG. 6 is a perspective schematic structural diagram of the top liquid inlet mechanism and the cooperating adjustment mechanism of the turbine hydroelectric power generation device according to an embodiment of the present disclosure.
Figure 7:
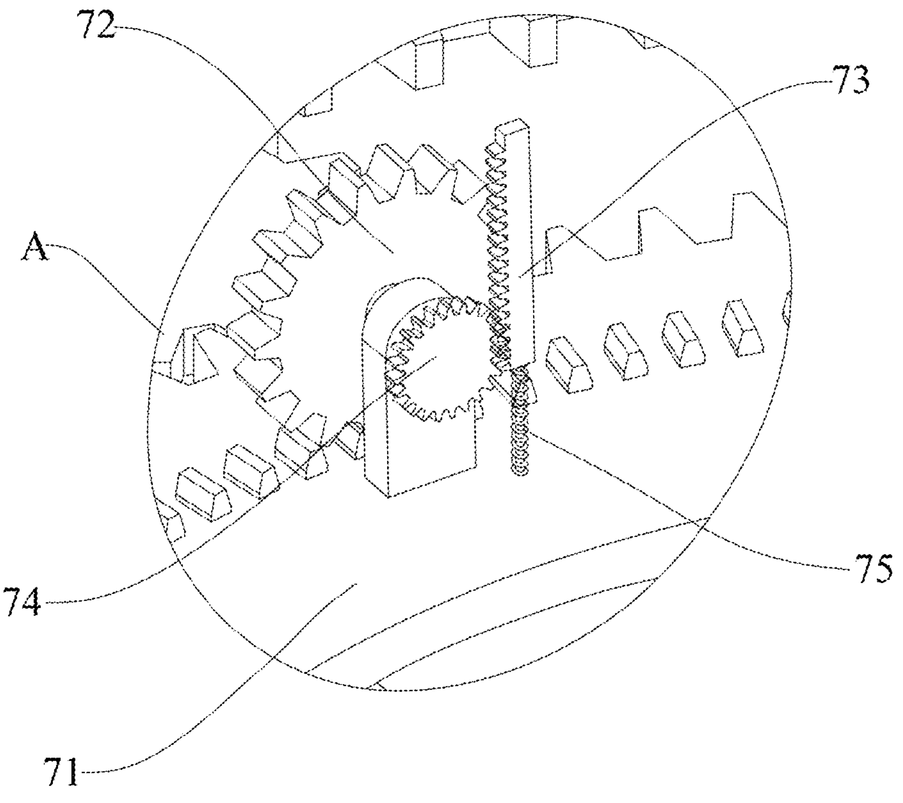
FIG. 7 is a partially enlarged schematic view of part A in FIG. 6 according to an embodiment of the present disclosure.
Figure 8:
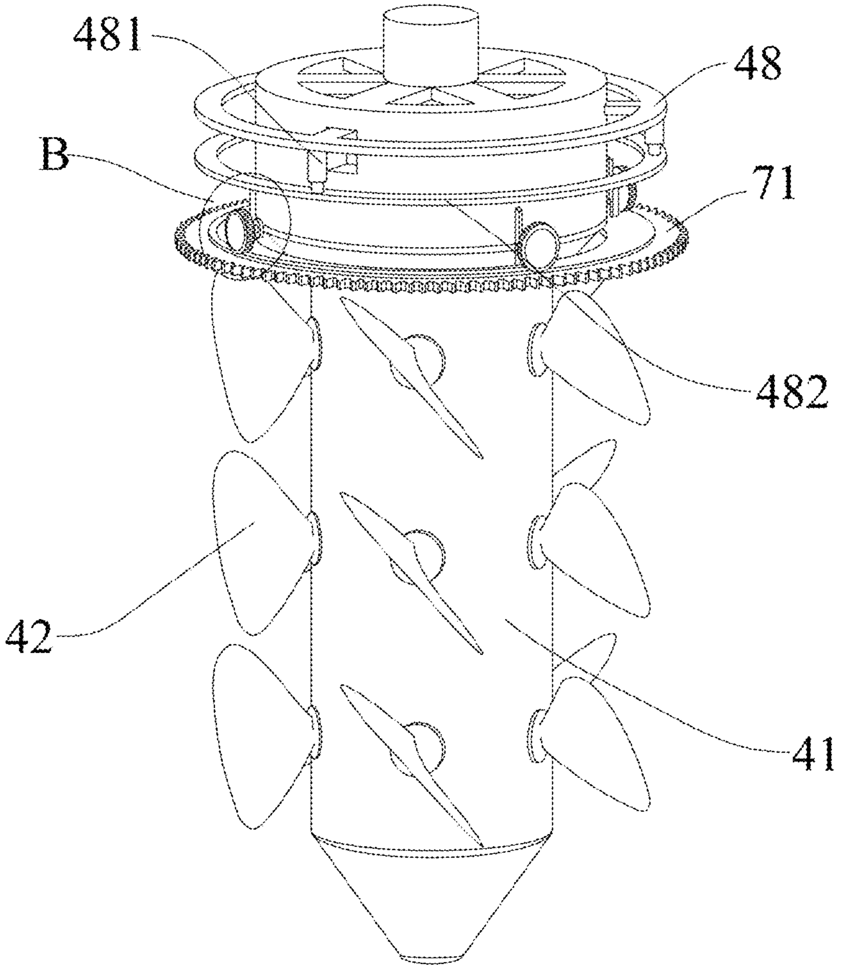
FIG. 8 is a perspective schematic structural diagram of the driving rotor and the cooperating adjustment mechanism of the turbine hydroelectric power generation device according to an embodiment of the present disclosure.
Figure 9:
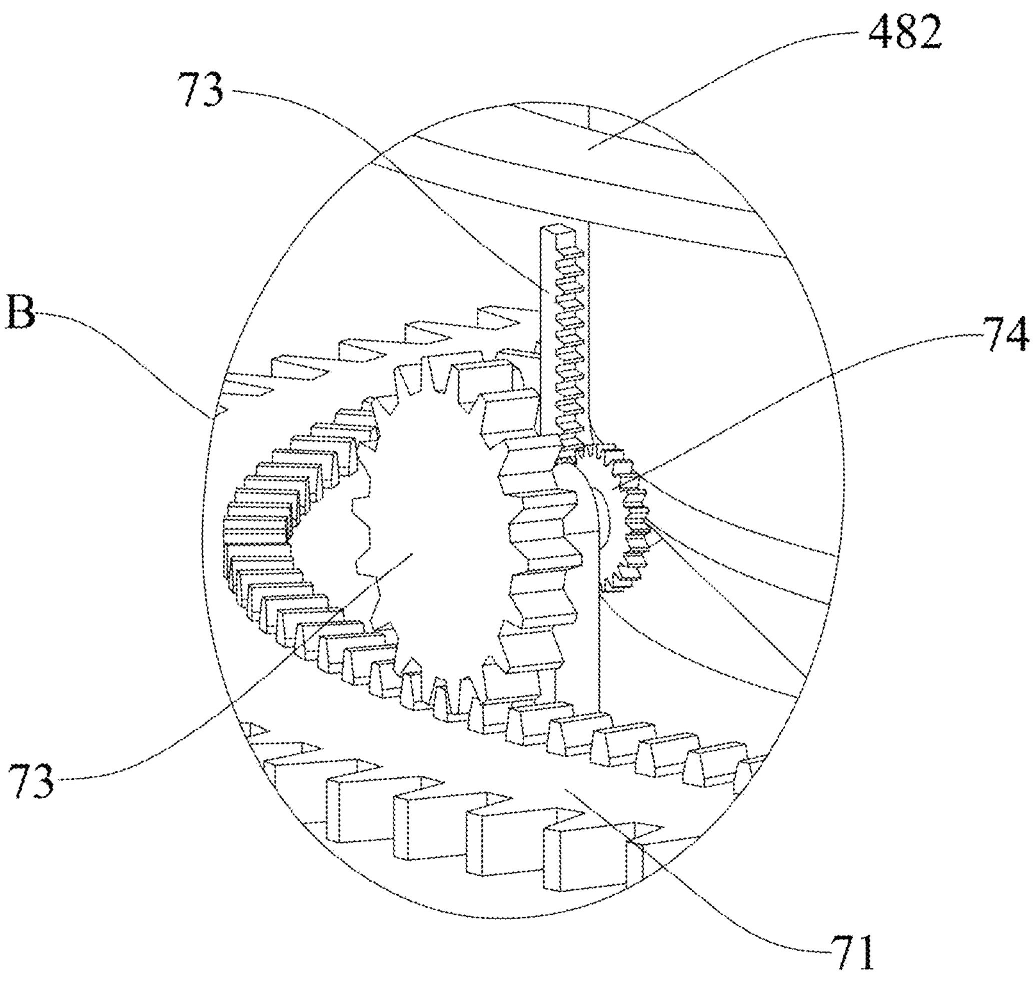
FIG. 9 is a partially enlarged schematic view of part B in FIG. 8 according to an embodiment of the present disclosure.
Figure 10:
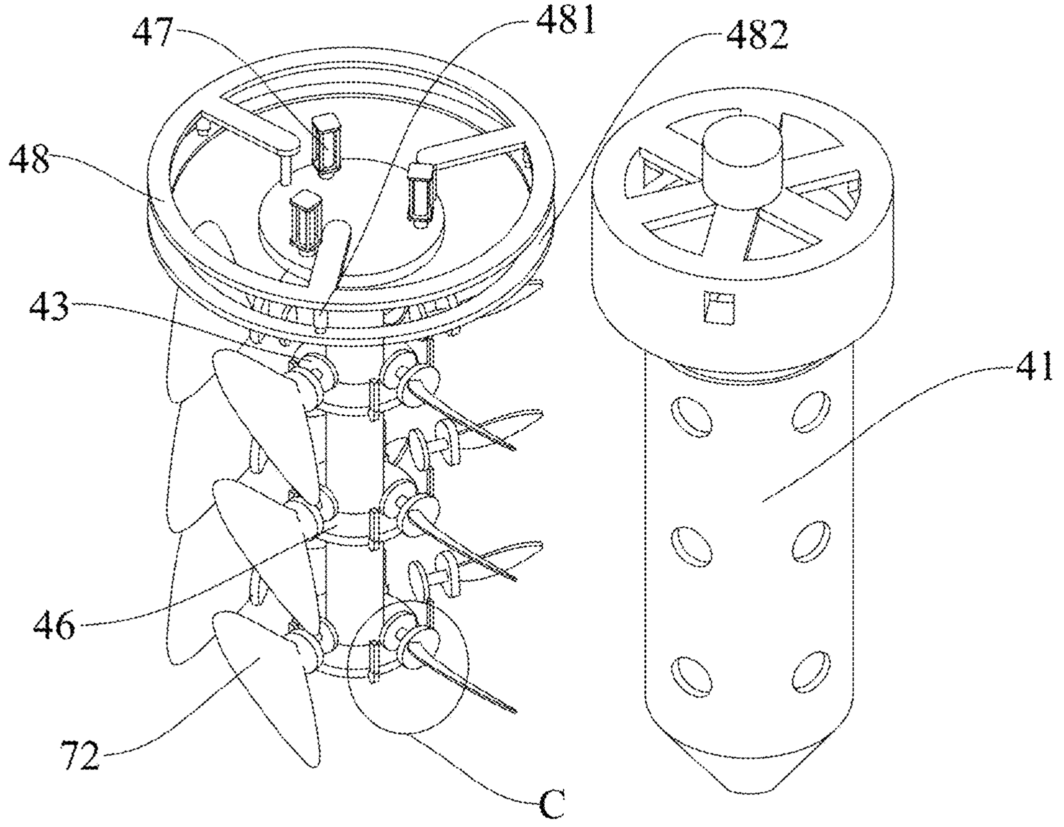
FIG. 10 is a schematic diagram of an assembled structure of the driving rotor of the turbine hydroelectric power generation device according to an embodiment of the present disclosure.
Figure 11:
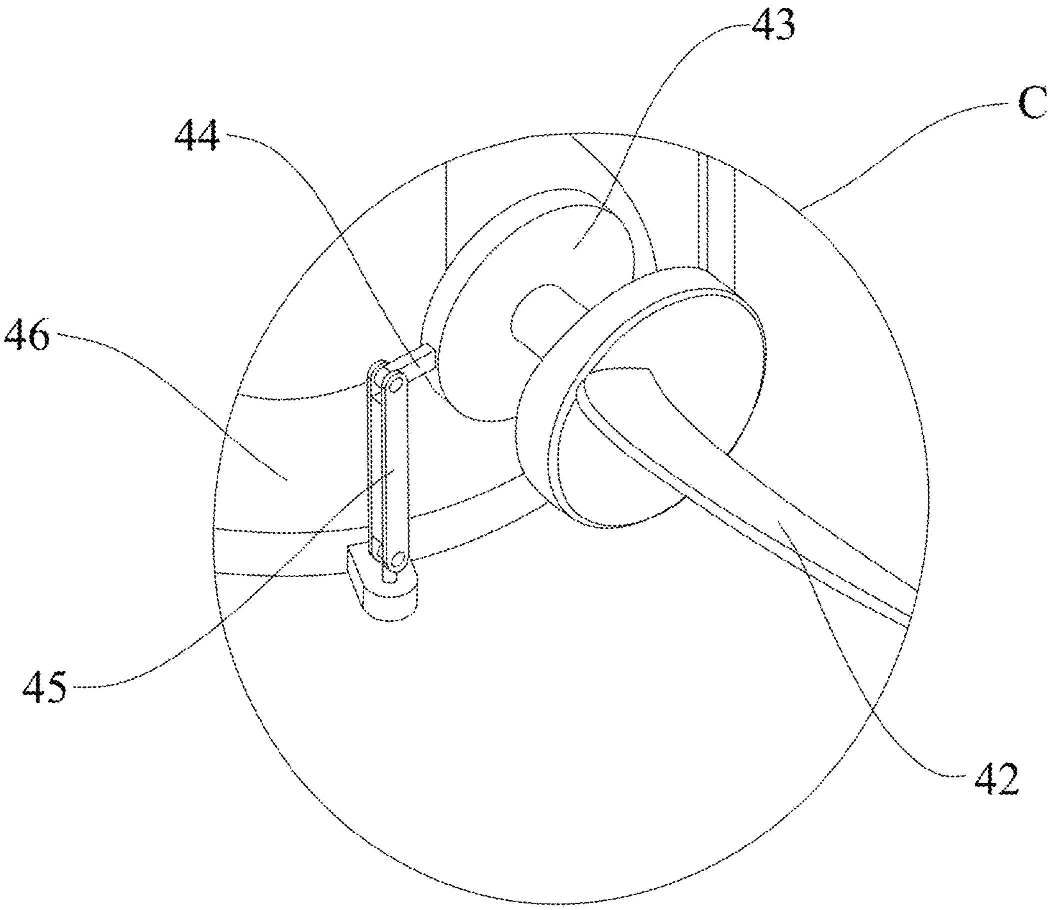
FIG. 11 is a partially enlarged schematic view of part C of FIG. 10 according to an embodiment of the present disclosure.
Figure 12:
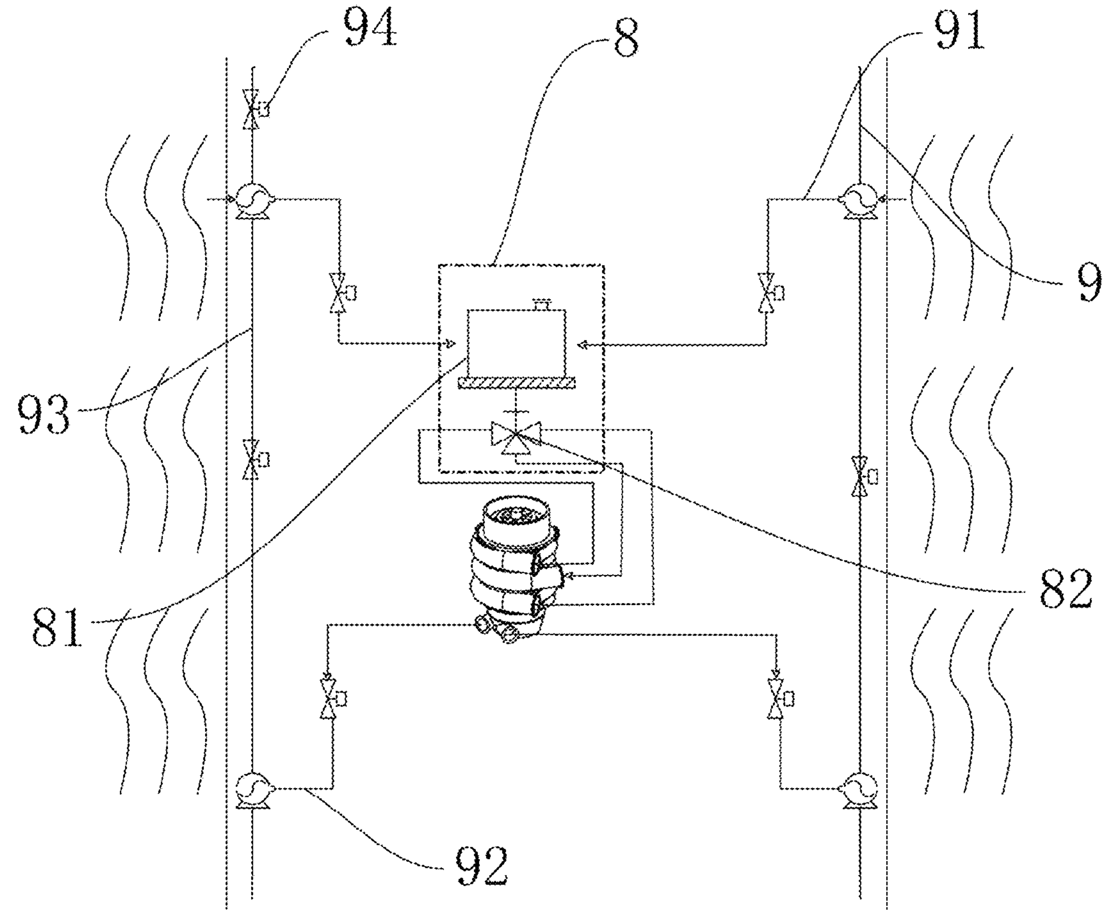
FIG. 12 is a schematic diagram of the connection between the turbine hydroelectric power generation device and pipelines according to an embodiment of the present disclosure.

Referring to FIGS. 1-12, a turbine hydroelectric power generation device includes a top liquid inlet mechanism 1, a middle fixing shell 2 and a bottom liquid discharge mechanism 3. A driving rotor 4 is rotatably arranged inside the middle fixing shell 2, and the top liquid inlet mechanism 1 is arranged on an outer side of the top end of the middle fixing shell 2. A magnetic power generation mechanism 5 is arranged above the middle fixing shell 2, a power generation rotor 6 is rotatably arranged inside the magnetic power generation mechanism 5, and the driving rotor 4 and the power generation rotor 6 are coaxially secured. The top liquid inlet mechanism 1 includes multiple liquid inlet flow channels 11, the liquid inlet flow channels 11 are all arranged around the outer side of the middle fixing shell 2, the liquid inlet flow channels 11 are all vortex-shaped spiral flow channels, and the cross section of each liquid inlet flow channel 11 gradually decreases from a head end to a tail end. The side of each liquid inlet flow channel 11 adjacent to the driving rotor 4 is provided with multiple guide vanes 111, and after the water flow input from the head end of each liquid inlet flow channel 11 is guided by the guide vanes 111, the water flow is output to the driving rotor 4 at the same flow velocity and thus impacts and drives the driving rotor 4 to rotate. The driving rotor 4 can drive, during rotation, the power generation rotor 6 to rotate inside the magnetic power generation mechanism 5 to generate electricity.

In use, the liquid inlet flow channels 11 can communicate with multiple water inlet pipelines respectively (a turbine hydroelectric power generation device in this embodiment can operate in an optimal power generation range when water flows under the same water pressure are input into the liquid inlet flow channels 11), and after the water flows are input into the liquid inlet flow channels 11 and guided by the guide vanes 111, by arranging the liquid inlet flow channels 11 that are the vortex-shaped spiral flow channels, it can be ensured that the water flows are evenly diverted by means of the guide of the guide vanes 111 and thus are output to the driving rotor 4 at the same flow velocity to impact and drive the driving rotor 4 to rotate. The driving rotor 4 can then drive, during rotation, the power generation rotor 6 to rotate inside the magnetic power generation mechanism 5 to generate electricity, and the input water flows are finally collected by the bottom liquid discharge mechanism 3 and then separated into multiple water flows to be output respectively. Accordingly, the energy of the water flows input from the liquid inlet flow channels 11 can be stably utilized, the stability of the rotational speed of the driving rotor 4 is ensured by means of the guide of the guide vanes 111 and uniform diversion of the vortex-shaped spiral flow channels, the power stability of power generation by means of the rotation of the power generation rotor 6 inside the magnetic power generation mechanism 5 can thus be ensured, so that a power generation effect can be ensured while the fluctuation of power generation is avoided from affecting the stability of a power grid.

Embodiment 2

With reference to FIGS. 1-12, the differences from the above embodiment lie in that preferably, the top liquid inlet mechanism 1 further includes a flow distributor 8, the flow distributor 8 can communicate with liquid inlet branch pipes 91, and the liquid input into the liquid inlet branch pipes 91 can enter an interior of flow distributor 8. The bottom liquid discharge mechanism 3 includes an integral liquid discharge mechanism 31 and a shunting liquid discharge mechanism 32, and the liquid output from the integral liquid discharge mechanism 31 can be dispensed by the shunting liquid discharge mechanism 32 to be output to multiple liquid discharge branch pipes 92. Each liquid inlet branch pipe 91 corresponds to one liquid discharge branch pipe 92, and the liquid inlet branch pipe 91 and the corresponding liquid discharge branch pipe 92 communicate with a main pipeline 9.

Preferably, the flow distributor 8 includes a liquid collecting tank 81 and a liquid dispenser 82. The liquid inlet branch pipes 91 communicate with the liquid collecting tank 81. The liquid can be input into the liquid collecting tank 81 from the liquid inlet branch pipes 91. The flow distributor 8 can output the liquid inside the liquid collecting tank 81 to the liquid inlet flow channels 11 at the same flow velocity, the same flow rate and the same output height. The total lengths of the liquid inlet flow channels 11 are the same, and the differences between the head ends and the tail ends of the liquid inlet flow channels 11 are also equal.

In specific use, the water flows input into input pipelines is first collected by the liquid collecting tank 81, the liquid inside the liquid collecting tank 81 is output to the liquid inlet flow channels 11 at the same flow velocity, the same flow rate and the same output height under the action of the distributor (both the liquid collecting tank 81 and the distributor in this embodiment are common technical solutions in the conventional art). The stability of the water flows respectively output from the liquid inlet flow channels 11 can be ensured by controlling the distributor when the water flow rates of the input pipeline are unstable. Due to the fact that the liquid inlet flow channels 11 have the equal total lengths and the equal height differences, the stability of the rotational speed of the driving rotor 4 is ensured by means of the guide of the guide vanes 111 and the uniform diversion of the vortex-shaped spiral flow channels; the instability of the water flow rate due to the fluctuation in downstream water consumption can be effectively avoided from impacting the stability of power generation. The liquid output from the integral liquid discharge mechanism 31 can also be output to the multiple liquid discharge branch pipes 92 by means of the dispensing of the shunting liquid discharge mechanism 32, the uniformity of the water flows output from the liquid discharge branch pipes 92 is ensured, the effective supply of the downstream water flows is thus ensured. Therefore, while ensuring downstream water supply, the stability of power generation is ensured.

Embodiment 3

Referring to FIGS. 1-12, the differences from the above embodiment lie in that the liquid inlet flow channels 11 have a vortex centerline 10, and the included angles between the guide vanes 111 and the vortex centerline 10 are the same. Deflection rods 112 are arranged at ends of the guide vanes 111, the deflection rods 112 penetrate through the liquid inlet flow channels 11, and drive gears 113 are arranged at ends of the deflection rods 112 outside the liquid inlet flow channels 11. A synchronous adjustment ring gear 12 is arranged on the outer side of the circumference defined by the drive gears 113. The synchronous adjustment ring gear 12 simultaneously meshes with the drive gears 113. The included angles between the guide vanes 111 and the vortex centerline 10 can be adjusted synchronously by driving the synchronous adjustment ring gear 12 to rotate.

The driving rotor 4 includes a rotor housing 41 and multiple rotor blades 42, each of the guide vanes 111 corresponds to one rotor blade 42. Connecting rotary disks 43 are arranged at ends of the rotor blades 42 adjacent to the rotor housing 41, and the connecting rotary disks 43 are embedded on the surface of the rotor housing 41. The included angles between the rotor blades 42 and a vertical plane are the same. The connecting rotary disks 43 are rotatably connected to the rotor housing 41, and the sealing is kept between the connecting rotary disks 43 and the rotor housing 41 during the rotation of the connecting rotary disks 43.

A rotary connection rod 44 is rotatably arranged on one side of each of the connecting rotary disks 43 inside the rotor housing 41. Each rotary connection rods 44 is rotatably connected to a lifting drive disk 46 by means of a lifting connection rod 45. Vertical ascending and descending of the lifting drive disk 46 is controlled by means of drive cylinders 47. During the vertical ascending and descending of the lifting drive disks 46, the connecting rotary disks 43 rotate synchronously to adjust the included angles between the rotor blades 42 and the vertical plane.

A cooperating adjustment mechanism 7 is arranged on the inner side of the circumference defined by the drive gears 113, and the cooperating adjustment mechanism 7 includes a cooperating drive ring gear 71, rotary enlargement gears 72 and rotary drive racks 73. The outer side of the cooperating drive ring gear 71 meshes simultaneously with the drive gears 113. The top end of the cooperating drive ring gear 71 meshes with the rotary enlargement gears 72, the rotary enlargement gears 72 are coaxially fixed with driven gears 74, and the rotary drive racks 73 mesh with the driven gears 74. Reset springs 75 are arranged at the bottom ends of the rotary drive racks 73. A cooperating drive plate 48 is further arranged outside movable ends of the drive cylinders 47, and a cooperating press plate 482 is connected to a bottom end of the cooperating drive plate 48 through cooperating cylinders 481.

When the included angles between the guide vanes 111 and the vortex centerline 10 as well as the included angles between the rotor blades 42 and the vertical plane are cooperatively controlled, the cooperating press plate 482 is brought into abut against the top ends of the rotary drive racks 73 through the extension of the cooperating cylinders 481. Under the driving of the drive cylinders 47, the included angles between the guide vanes 111 and the vortex centerline 10 are adjusted in synchronism with the included angles between the rotor blades 42 and the vertical plane.

When the included angles between the guide vanes 111 and the vortex centerline 10 as well as the included angles between the rotor blades 42 and the vertical plane are respectively controlled, the cooperating cylinder 481 retracts, and the cooperating press plate 482 is kept disengaged from the rotary drive racks 73 as the drive cylinders 47 drive the cooperating press plate 482 to move. The included angles between the rotor blades 42 and the vertical plane are synchronously adjustable by means of the driving of the drive cylinders 47, and the included angles between the guide vanes 111 and the vortex centerline 10 are synchronously adjustable by means of the driving of the synchronous adjustment ring gear 12.

Accordingly, by means of the above cooperative control and the respective control, the included angles between the guide vanes 111 and the vortex centerline 10 can be dynamically adjusted synchronously according to an actual water flow rate (the magnitude of the potential energy of water), the mutual matching of the water flow rate and the generated power can thus be effectively ensured, and the effect of power generation can be improved.

The integral liquid discharge mechanism 31 is arranged at the bottom end of the driving rotor 4, and the inner diameter of the integral liquid discharge mechanism 31 gradually increases and then gradually decreases from top to bottom, so as to avoid damage to the rotor blades 42 of the driving rotor 4 due to a cavitation erosion phenomenon. The power generation rotor 6 can rotate along with the rotation of the driving rotor 4, and magnetic induction lines inside the magnetic power generation mechanism 5 are cut to generate electricity during the rotation of the power generation rotor 6.

Embodiment 4

A power generation method based on pressurized water inlet pipelines, which uses the turbine hydroelectric power generation device as described in any one of Embodiments 1-3, includes the following steps.

Liquid inlet branch pipes 91 and liquid discharge branch pipes 92 are introduced from the pressurized water inlet pipelines 93, and control valves 94 are arranged on the pressurized water inlet pipelines 93, the liquid inlet branch pipes 91 and the liquid discharge branch pipes 92.

The liquid inlet branch pipes 91 respectively communicate with the liquid inlet flow channels 11, and the liquid discharge branch pipes 92 communicate with the bottom liquid discharge mechanism 3.

The control valves 94 of the pressurized water inlet pipelines 93 are closed, and the control valves 94 of the liquid inlet branch pipes 91 and the control valves 94 of the liquid discharge branch pipes 92 are opened.

The pressurized water inlet pipelines 93 output water flows from the corresponding liquid inlet branch pipes 91 to the liquid inlet flow channels 11. After the water flows are guided by the guide vanes 111, the water flows are output to the driving rotor 4 at the same flow velocity to impact and drive the driving rotor 4 to rotate and are then input, through the bottom liquid discharge mechanism 3, into the corresponding pressurized water inlet pipelines 93 from the liquid discharge branch pipes 92.

The driving rotor 4 drives, during rotation, the power generation rotor 6 to rotate inside the magnetic power generation mechanism 5 to generate electricity.

By introducing the liquid inlet branch pipes 91 and the liquid discharge branch pipes 92 from the pressurized water inlet pipelines 93, it is ensured that a turbine hydroelectric power generation device as described in any one of Embodiments 1-3 is implemented on the premise of ensuring the safe water supply of a water plant, the water inflow of the water plant is implemented through bypass pipelines during normal operation of the device, and in case of the maintenance or malfunction of the device, the water inflow is implemented by switching the bypass pipelines to the original pressurized water inlet pipelines 93, ensuring the stability of water supply of the water plant. By arranging the multiple liquid inlet flow channels 11, the converged water flows from the multiple pressurized water inlet pipelines 93 are fully used, the number of the power generation devices coming into service is decreased while increasing the quantity of water inflow and ensuring generated power, and the costs for utilizing the remaining water energy are saved.

Although embodiments of the present disclosure have been shown and described, it will be appreciated by those of ordinary skill in the art that various changes, modifications, substitutions, and variations may be made to the embodiments without departing from the principle and spirit of the present disclosure, and the scope of the present disclosure is defined by the appended claims and their equivalents.

What is claimed is:

1. A turbine hydroelectric power generation device, comprising a top liquid inlet mechanism, a middle fixing shell and a bottom liquid discharge mechanism, wherein a driving rotor is rotatably arranged inside the middle fixing shell, and the top liquid inlet mechanism is arranged on an outer side of a top end of the middle fixing shell;

a magnetic power generation mechanism is arranged above the middle fixing shell, a power generation rotor is rotatably arranged inside the magnetic power generation mechanism, and the driving rotor and the power generation rotor are coaxially secured;

the top liquid inlet mechanism comprises a plurality of liquid inlet flow channels, the plurality of liquid inlet flow channels are all arranged around an outer side of the middle fixing shell, the plurality of liquid inlet flow channels are all vortex-shaped spiral flow channels, and a cross section of each of the plurality of liquid inlet flow channels gradually decreases from a head end to a tail end;

a side of each of the plurality of liquid inlet flow channels adjacent to the driving rotor is provided with a plurality of guide vanes, and after a water flow input from the head end of each of the plurality of liquid inlet flow channels is guided by the plurality of guide vanes, the water flow is output to the driving rotor at a same flow velocity and impacts and drives the driving rotor to rotate; and the driving rotor is capable of driving, during rotation, the power generation rotor to rotate inside the magnetic power generation mechanism to generate electricity.

2. The turbine hydroelectric power generation device according to claim 1, wherein the top liquid inlet mechanism further comprises a flow distributor, the flow distributor is capable of communicating with liquid inlet branch pipes, and liquid input into the liquid inlet branch pipes is capable of entering an interior of the flow distributor;

the bottom liquid discharge mechanism comprises an integral liquid discharge mechanism and a shunting liquid discharge mechanism, and the liquid output from the integral liquid discharge mechanism can be dispensed by the shunting liquid discharge mechanism to be output to a plurality of liquid discharge branch pipes; and each of the liquid inlet branch pipes corresponds to one of the plurality of liquid discharge branch pipes, and each of the liquid inlet branch pipes and a corresponding one of the plurality of liquid discharge branch pipes communicate with a main pipeline.

3. The turbine hydroelectric power generation device according to claim 2, wherein the flow distributor comprises a liquid collecting tank and a liquid dispenser, the liquid inlet branch pipes communicate with the liquid collecting tank, the liquid is capable of being input into the liquid collecting tank from the liquid inlet branch pipes, and the flow distributor is capable of outputting the liquid inside the liquid collecting tank to the plurality of liquid inlet flow channels at a same flow velocity, a same flow rate and a same output height; and total lengths of the plurality of liquid inlet flow channels are same, and a height difference between the head end and the tail end of each of the plurality of liquid inlet flow channels is also equal.

4. The turbine hydroelectric power generation device according to claim 1, wherein the plurality of liquid inlet flow channels have a vortex centerline, and included angles between the plurality of guide vanes and the vortex centerline are same;

deflection rods are arranged at ends of the plurality of guide vanes, the deflection rods penetrate through the plurality of liquid inlet flow channels, and drive gears are arranged at ends of the deflection rods outside the plurality of liquid inlet flow channels; and a synchronous adjustment ring gear is arranged on an outer side of a circumference defined by the drive gears, the synchronous adjustment ring gear simultaneously meshes with the drive gears, and the included angles between the plurality of guide vanes and the vortex centerline are capable of being adjusted synchronously by driving the synchronous adjustment ring gear to rotate.

5. The turbine hydroelectric power generation device according to claim 4, wherein the driving rotor comprises a rotor housing and a plurality of rotor blades, each of the plurality of guide vanes corresponds to one of the plurality of rotor blades, connecting rotary disks are arranged at ends of the plurality of rotor blades adjacent to the rotor housing, and the connecting rotary disks are embedded on a surface of the rotor housing; and included angles between the plurality of rotor blades and a vertical plane are same, the connecting rotary disks are rotatably connected to the rotor housing, and sealing is kept between the connecting rotary disks and the rotor housing during rotation of the connecting rotary disks.

6. The turbine hydroelectric power generation device according to claim 5, wherein rotary connection rods are rotatably arranged on sides of the connecting rotary disks inside the rotor housing, the rotary connection rods are rotatably connected to lifting drive disks by means of lifting connection rods, and vertical ascending and descending of the lifting drive disks is controlled by means of drive cylinders; and during the vertical ascending and descending of the lifting drive disks, the connecting rotary disks rotate synchronously to adjust the included angles between the rotor blades and the vertical plane.

7. The turbine hydroelectric power generation device according to claim 6, wherein a cooperating adjustment mechanism is arranged on an inner side of the circumference defined by the drive gears, and the cooperating adjustment mechanism comprises a cooperating drive ring gear, rotary enlargement gears and rotary drive racks;

an outer side of the cooperating drive ring gear meshes simultaneously with the drive gears, a top end of the cooperating drive ring gear meshes with the rotary enlargement gears, the rotary enlargement gears are coaxially fixed with driven gears, and the rotary drive racks mesh with the driven gears; and reset springs are arranged at bottom ends of the rotary drive racks, a cooperating drive plate is further arranged outside movable ends of the drive cylinders, and a cooperating press plate is connected to a bottom end of the cooperating drive plate through cooperating cylinders.

8. The turbine hydroelectric power generation device according to claim 7, wherein when the included angles between the plurality of guide vanes and the vortex centerline as well as the included angles between the plurality of rotor blades and the vertical plane are cooperatively controlled, the cooperating press plate is brought into abut against top ends of the rotary drive racks through an extension of the cooperating cylinders, and under driving of the drive cylinders, the included angles between the plurality of guide vanes and the vortex centerline are adjusted in synchronism with the included angles between the plurality of rotor blades and the vertical plane; and when the included angles between the plurality of guide vanes and the vortex centerline as well as the included angles between the plurality of rotor blades and the vertical plane are respectively controlled, the cooperating cylinders retract, and the cooperating press plate is kept disengaged from the rotary drive racks as the drive cylinders drive the cooperating press plate to move; the included angles between the plurality of rotor blades and the vertical plane are synchronously adjustable by means of the driving of the drive cylinders, and the included angles between the plurality of guide vanes and the vortex centerline are synchronously adjustable by means of driving of the synchronous adjustment ring gear.

9. The turbine hydroelectric power generation device according to claim 2, wherein the integral liquid discharge mechanism is arranged at a bottom end of the driving rotor, and an inner diameter of the integral liquid discharge mechanism gradually increases and then gradually decreases from top to bottom; and the power generation rotor is rotatable along with the rotation of the driving rotor, and magnetic induction lines inside the magnetic power generation mechanism are cut to generate electricity during rotation of the power generation rotor.

10. A power generation method based on pressurized water inlet pipelines, wherein the power generation method uses the turbine hydroelectric power generation device as claimed in claim 1, and comprises the following steps:

introducing liquid inlet branch pipes and a plurality of liquid discharge branch pipes from the pressurized water inlet pipelines, and arranging control valves on the pressurized water inlet pipelines, the liquid inlet branch pipes and the plurality of liquid discharge branch pipes;

communicating the liquid inlet branch pipes with the plurality of liquid inlet flow channels, respectively, and communicating the plurality of liquid discharge branch pipes with the bottom liquid discharge mechanism;

closing the control valves of the pressurized water inlet pipelines, and opening the control valves of the liquid inlet branch pipes and the control valves of the plurality of liquid discharge branch pipes;

outputting water flows through the pressurized water inlet pipelines from the liquid inlet branch pipes to the plurality of liquid inlet flow channels, respectively, after guiding the water flows by the plurality of guide vanes, outputting the water flows to the driving rotor at the same flow velocity to impact and drive the driving rotor to rotate, and then inputting, through the bottom liquid discharge mechanism, the water flows into the pressurized water inlet pipelines from the plurality of liquid discharge branch pipes, respectively; and driving, during the rotation of the driving rotor, the power generation rotor to rotate inside the magnetic power generation mechanism to generate electricity.

11. The power generation method based on the pressurized water inlet pipelines according to claim 10, wherein the top liquid inlet mechanism further comprises a flow distributor, the flow distributor is capable of communicating with the liquid inlet branch pipes, and liquid input into the liquid inlet branch pipes is capable of entering an interior of the flow distributor;

the bottom liquid discharge mechanism comprises an integral liquid discharge mechanism and a shunting liquid discharge mechanism, and the liquid output from the integral liquid discharge mechanism can be dispensed by the shunting liquid discharge mechanism to be output to the plurality of liquid discharge branch pipes; and each of the liquid inlet branch pipes corresponds to one of the plurality of liquid discharge branch pipes, and each of the liquid inlet branch pipes and a corresponding one of the plurality of liquid discharge branch pipes communicate with a main pipeline.

12. The power generation method based on the pressurized water inlet pipelines according to claim 11, wherein the flow distributor comprises a liquid collecting tank and a liquid dispenser, the liquid inlet branch pipes communicate with the liquid collecting tank, the liquid is capable of being input into the liquid collecting tank from the liquid inlet branch pipes, and the flow distributor is capable of outputting the liquid inside the liquid collecting tank to the plurality of liquid inlet flow channels at a same flow velocity, a same flow rate and a same output height; and total lengths of the plurality of liquid inlet flow channels are same, and a height difference between the head end and the tail end of each of the plurality of liquid inlet flow channels is also equal.

13. The power generation method based on the pressurized water inlet pipelines according to claim 10, wherein the plurality of liquid inlet flow channels have a vortex centerline, and included angles between the plurality of guide vanes and the vortex centerline are same;

deflection rods are arranged at ends of the plurality of guide vanes, the deflection rods penetrate through the plurality of liquid inlet flow channels, and drive gears are arranged at ends of the deflection rods outside the plurality of liquid inlet flow channels; and a synchronous adjustment ring gear is arranged on an outer side of a circumference defined by the drive gears, the synchronous adjustment ring gear simultaneously meshes with the drive gears, and the included angles between the plurality of guide vanes and the vortex centerline are capable of being adjusted synchronously by driving the synchronous adjustment ring gear to rotate.

14. The power generation method based on the pressurized water inlet pipelines according to claim 13, wherein the driving rotor comprises a rotor housing and a plurality of rotor blades, each of the plurality of guide vanes corresponds to one of the plurality of rotor blades, connecting rotary disks are arranged at ends of the plurality of rotor blades adjacent to the rotor housing, and the connecting rotary disks are embedded on a surface of the rotor housing; and included angles between the plurality of rotor blades and a vertical plane are same, the connecting rotary disks are rotatably connected to the rotor housing, and sealing is kept between the connecting rotary disks and the rotor housing during rotation of the connecting rotary disks.

15. The power generation method based on the pressurized water inlet pipelines according to claim 14, wherein rotary connection rods are rotatably arranged on sides of the connecting rotary disks inside the rotor housing, the rotary connection rods are rotatably connected to lifting drive disks by means of lifting connection rods, and vertical ascending and descending of the lifting drive disks is controlled by means of drive cylinders; and during the vertical ascending and descending of the lifting drive disks, the connecting rotary disks rotate synchronously to adjust the included angles between the rotor blades and the vertical plane.

16. The power generation method based on the pressurized water inlet pipelines according to claim 15, wherein a cooperating adjustment mechanism is arranged on an inner side of the circumference defined by the drive gears, and the cooperating adjustment mechanism comprises a cooperating drive ring gear, rotary enlargement gears and rotary drive racks;

an outer side of the cooperating drive ring gear meshes simultaneously with the drive gears, a top end of the cooperating drive ring gear meshes with the rotary enlargement gears, the rotary enlargement gears are coaxially fixed with driven gears, and the rotary drive racks mesh with the driven gears; and reset springs are arranged at bottom ends of the rotary drive racks, a cooperating drive plate is further arranged outside movable ends of the drive cylinders, and a cooperating press plate is connected to a bottom end of the cooperating drive plate through cooperating cylinders.

17. The power generation method based on the pressurized water inlet pipelines according to claim 16, wherein when the included angles between the plurality of guide vanes and the vortex centerline as well as the included angles between the plurality of rotor blades and the vertical plane are cooperatively controlled, the cooperating press plate is brought into abut against top ends of the rotary drive racks through an extension of the cooperating cylinders, and under driving of the drive cylinders, the included angles between the plurality of guide vanes and the vortex centerline are adjusted in synchronism with the included angles between the plurality of rotor blades and the vertical plane; and when the included angles between the plurality of guide vanes and the vortex centerline as well as the included angles between the plurality of rotor blades and the vertical plane are respectively controlled, the cooperating cylinders retract, and the cooperating press plate is kept disengaged from the rotary drive racks as the drive cylinders drive the cooperating press plate to move; the included angles between the plurality of rotor blades and the vertical plane are synchronously adjustable by means of the driving of the drive cylinders, and the included angles between the plurality of guide vanes and the vortex centerline are synchronously adjustable by means of driving of the synchronous adjustment ring gear.

18. The power generation method based on the pressurized water inlet pipelines according to claim 11, wherein the integral liquid discharge mechanism is arranged at a bottom end of the driving rotor, and an inner diameter of the integral liquid discharge mechanism gradually increases and then gradually decreases from top to bottom; and the power generation rotor is rotatable along with the rotation of the driving rotor, and magnetic induction lines inside the magnetic power generation mechanism are cut to generate electricity during rotation of the power generation rotor.

* * * * *